(12) United States Patent
Hasegawa et al.

(10) Patent No.: US 9,116,757 B2
(45) Date of Patent: Aug. 25, 2015

(54) DATA PROCESSING APPARATUS INCLUDING PLURALITY OF APPLICATIONS AND METHOD

(71) Applicant: CASIO COMPUTER CO., LTD., Shibuya-ku, Tokyo (JP)

(72) Inventors: Hirokazu Hasegawa, Tokyo (JP); Toshiaki Kanamura, Tokyo (JP)

(73) Assignee: Casio Computer Co., Ltd, Tokyo (JP)

( * ) Notice: Subject to any disclaimer, the term of this patent is extended or adjusted under 35 U.S.C. 154(b) by 94 days.

(21) Appl. No.: 13/953,869

(22) Filed: Jul. 30, 2013

(65) Prior Publication Data

US 2014/0059569 A1 Feb. 27, 2014

(30) Foreign Application Priority Data

Aug. 24, 2012 (JP) .................................. 2012-185245

(51) Int. Cl.
*G06F 13/00* (2006.01)
*G06F 9/54* (2006.01)
*G06F 3/00* (2006.01)

(52) U.S. Cl.
CPC . *G06F 9/54* (2013.01); *G06F 3/005* (2013.01)

(58) Field of Classification Search
CPC ............................ G06F 9/45512; H04L 29/06
USPC .................................................. 719/310, 320
See application file for complete search history.

(56) References Cited

U.S. PATENT DOCUMENTS

| | | | |
|---|---|---|---|
| 7,665,029 B2 * | 2/2010 | Nakajima | 715/771 |
| 8,275,617 B1 * | 9/2012 | Morgan et al. | 704/251 |
| 8,893,054 B2 * | 11/2014 | Amento et al. | 715/863 |
| 2007/0136693 A1 * | 6/2007 | Lilleness et al. | 715/835 |
| 2007/0157117 A1 * | 7/2007 | Viitala | 715/810 |
| 2010/0257479 A1 * | 10/2010 | Do et al. | 715/780 |
| 2010/0287499 A1 * | 11/2010 | Zhang | 715/808 |

FOREIGN PATENT DOCUMENTS

JP        2012-014606        1/2012

* cited by examiner

*Primary Examiner* — Andy Ho
(74) *Attorney, Agent, or Firm* — Amin, Turocy & Watson, LLP

(57) ABSTRACT

An object of the present invention is to provide a data processing apparatus in which, merely by an arbitrary indicator being specified by a user from the array of indicators representing plural types of instructive information which is acceptable during the execution of an application, an operation allotted to the indicator is executed. In the present invention, a CPU recognizes a mark on a paper sheet specified by a user through the analysis of an image of the paper sheet photographed by a document camera, and after reading out a command corresponding to the mark with reference to a mark table based on the mark, instructs the currently executed application to perform an operation corresponding to the command.

15 Claims, 13 Drawing Sheets

FIG. 4
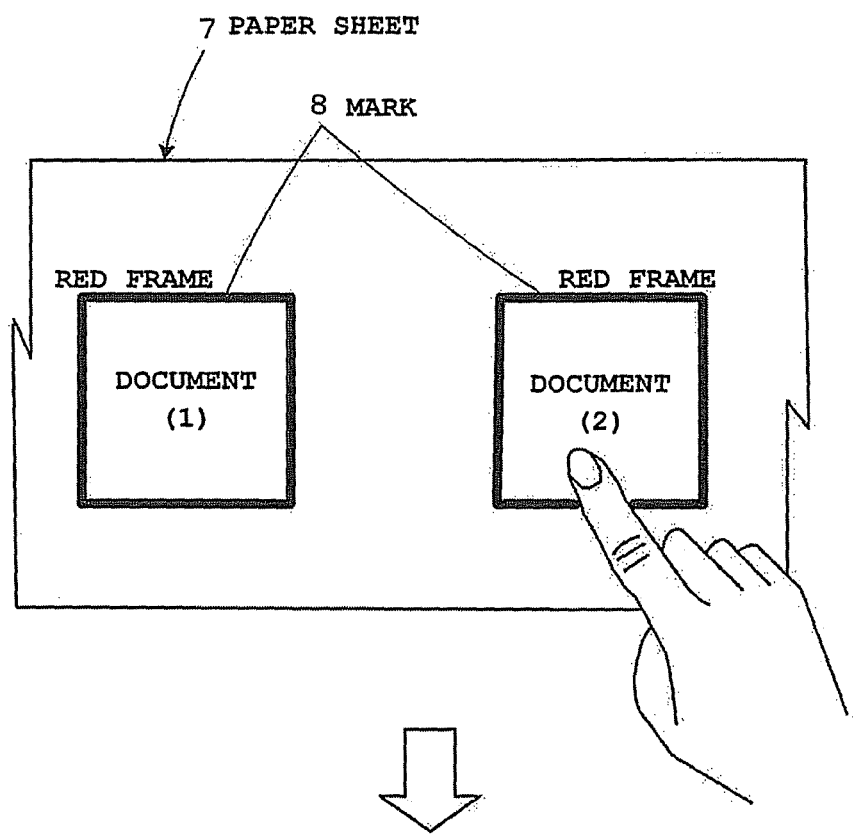
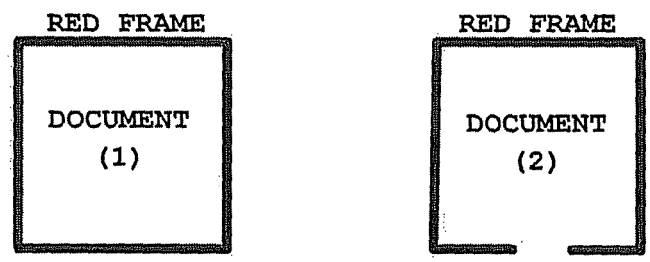

FIG. 9

APPLICATION A
(CONFERENCE
APPLICATION)
CONFERENCE (1)
CONFIGURATION (1)

APPLICATION A
(CONFERENCE
APPLICATION)
CONFERENCE (2)
CONFIGURATION (2)

APPLICATION B

APPLICATION C

Z SHEET MANAGEMENT TABLE

| CONFIGURATION FILE ID | INTERNAL TABLE ID | SHEET ID |
|---|---|---|
| APPLICATION A (CONFERENCE 1) | 11 | ID1 |
| APPLICATION A (CONFERENCE 1) | 12 | ID2 |
| APPLICATION A (CONFERENCE 2) | 21 | ID3 |
| APPLICATION A (CONFERENCE 2) | 22 | ID4 |
| APPLICATION A (CONFERENCE 2) | 23 | ID5 |
| ... | ... | ... |
| APPLICATION B (CONFERENCE 1) | *** | *** |
| APPLICATION C (CONFERENCE 2) | *** | *** |

DATA PROCESSING APPARATUS INCLUDING PLURALITY OF APPLICATIONS AND METHOD

CROSS-REFERENCE TO RELATED APPLICATION

This application is based upon and claims the benefit of priority from the prior Japanese Patent Application No. 2012-185245, filed Aug. 24, 2012, the entire contents of which are incorporated herein by reference.

BACKGROUND OF THE INVENTION

1. Field of the Invention

The present invention relates to a data processing apparatus which includes a plurality of applications and a method.

2. Description of the Related Art

Conventionally, as a technology to simplify command input when commands (instructive information) are inputted to data processing apparatuses such as personal computers, there has been existed a technology in which a paper sheet is used as a command input medium, that is, a technology in which a state where a user designates one of a plurality of indicators (marks) printed on a paper sheet with user's fingertip is photographed by a camera, the designated indicator is determined by the photographed image being analyzed, and a command allotted to the indicator is inputted (see Japanese Patent Application Laid-Open (Kokai) Publication No. 2012-014606).

However, the aforementioned technology is a guidance system in which a mark on a pamphlet serving as a paper medium (paper sheet) which has been designated by a user is recognized, and information content corresponding to the mark is displayed on a floor surface. There is an apprehension in that an increase in the number of contents, which are displayable based on association between the mark and the information content, leads to an increase in the number of marks on the paper medium, which is troublesome on the whole and deteriorates operability on the contrary.

SUMMARY OF THE INVENTION

The present invention has been conceived in light of the above-described problems. An object of the present invention is to provide a data processing apparatus in which, merely by an arbitrary indicator being specified by a user from the array of indicators representing plural types of instructive information which is acceptable during the execution of an application, an operation allotted to the indicator is executed.

In accordance with one aspect of the present invention, there is provided a data processing apparatus including a plurality of applications, comprising: an indicator storing section which stores and manages, for each application, plural types of instructive information which is acceptable during execution of an application and plural types of indicators representing the instructive information such that the plural types of instructive information and the plural types of indicators are associated with each other; a determination section which determines an indicator arbitrarily specified by a user operation from an output medium where the indicators corresponding to the plural types of instructive information acceptable by a currently executed application have been outputted in an array; a selection section which selects, based on the indicator determined by the determination section, instructive information corresponding to the indicator with reference to the indicator storing section; and a control section which controls the currently executed application to perform an operation in accordance with the instructive information selected by the selection section.

In accordance with another aspect of the present invention, there is provided a data processing apparatus including a plurality of applications, comprising: an acquisition section which acquires plural types of instructive information which is acceptable during execution of an application; a generation section which generates plural types of indicators representing the instructive information, for each of the plural types of instructive information acquired by the acquisition section; an indicator storing section which stores and manages the plural types of instructive information acquired by the acquisition section and the plural types of indicators generated by the generation section such that the plural types of instructive information and the plural types of indicators are associated with each other; and an output section which outputs the plural types of indicators generated by the generation section, in an array.

According to the present invention, merely by an arbitrary indicator being designated by a user from the array of indicators representing plural types of instructive information which is acceptable during the execution of an application, the operation allotted to the indicator can be executed, whereby further improvement of the operability can be expected.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 4 is a diagram to describe a method of recognizing a mark;

FIG. 9 is a diagram to describe a sheet management table Z;

DETAILED DESCRIPTION OF THE PREFERRED EMBODIMENTS

Figure 1:
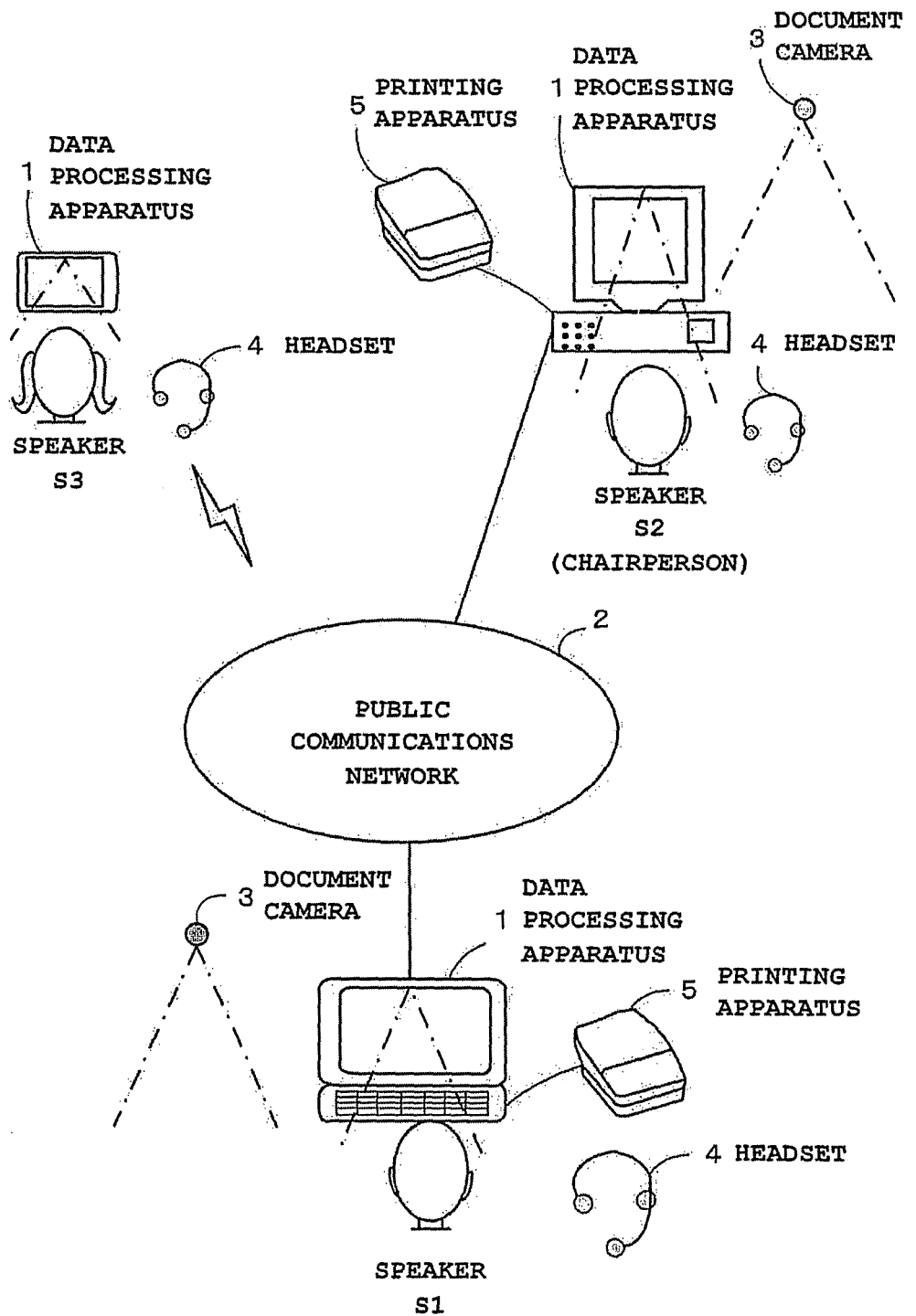
FIG. 1 is a block diagram illustrating a video conference system (communication system)

Hereinafter, the embodiment of the present invention will be described referring to FIGS. 1 to 12. FIG. 1 is a block diagram illustrating a video conference system (communication system). The video conference system is a communication system in which participants (speakers) in a teleconference perform voice calls with counterparts while watching facial images of the counterparts (for example, moving images) or document images on the screen of their own terminal. This video conference system is a teleconference system in which, desk-top-type or notebook-type personal computers and portable terminal apparatuses such as tablet terminals are connected as built-in-camera-equipped data processing apparatuses 1 via public communications networks 2 (Internet, wireless communications networks), and high-speed bidirectional communication is performed between the respective data processing apparatuses 1.

The data processing apparatuses 1 are each connected, by wire or radio, to a document camera 3 which photographs documents for meetings, a headset 4 in which a microphone and a headphone have been integrated, and a printing apparatus 5. In this case, the document camera 3 and the printing apparatus 5 are provided for all or several of participants (speakers) S1, S2, S3, etc., in addition to the data processing apparatus 1 and the headset 4. In the illustrated example, a case is exemplified where the document camera 3 and the printing apparatus 5 are provided on the side of the speakers S1 and S2, and one (speaker S2) out of the speakers S1, S2, S3, etc. serves as a chairperson (mediator).

The data processing apparatus 1 compresses a user's own facial image data acquired from the user's built-in camera (not illustrated in FIG. 1), document image data acquired from the document camera 3, or the user's voice data acquired from the headset 4, and transmits it to other data processing apparatuses 1. Also, when facial image data, document image data, and voice data of a counterpart in a teleconference are received and acquired from other data processing apparatuses 1, the data processing apparatus 1 performs processing for decompressing the image data and the voice data, and displays the image data on the user's terminal screen, outputs the voice to the headset 4, or transmits the document image data to the printing apparatus 5 so as to print it out.

Figure 2:
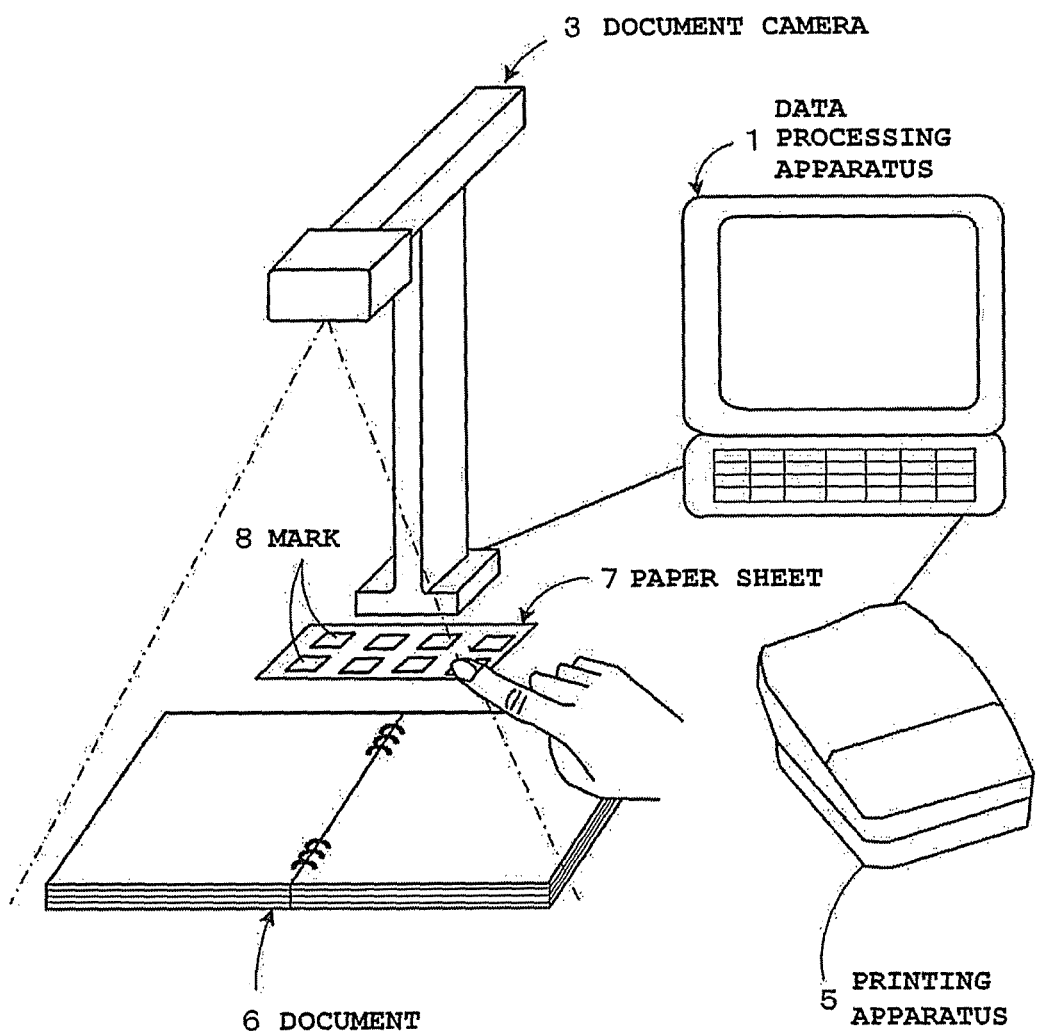
FIG. 2 is a diagram to describe a document camera 3 on the side of a data processing apparatus 1 constituting the video conference system.

FIG. 2 is a diagram to describe the document camera 3 which is connected, by wire or radio, to the side of the data processing apparatus 1. The document camera 3 is a stand-type digital camera that photographs a conference document 6 arranged on the surface of a desk and the like from the upward direction thereof (approximately right upward direction), in which an image of an object through a taking lens is formed by image sensor elements (CCD or CMOS) not shown, whereby a static image or a moving image is captured in high definition. Also, the document camera 3 functions as a camera which photographs a paper sheet 7 arranged within the range of photographing for the purpose of command input, and as a camera which photographs the conference document 6. Note that the document camera 3 is configured to have an image data processing section including a central processing apparatus, an image processing apparatus, and the like, in addition to an image data generating section including the taking lens and the image sensor elements. However, the image data processing section may be provided on the side of the data processing apparatus 1.

The paper sheet 7 is a paper sheet on which respective indicators (mark) 8 representing plural types of instructive information (commands) acceptable by an application are printed in an array for each application (for example, conference). This paper sheet 7 is printed and issued from the printing apparatus 5 for each application (for example, conference). In a state where the paper sheet 7 optimal for conferences is arranged within the imaging area of the document camera 3, when a user (a participant of a conference) carries out a pointing operation in which the user's fingertip is pointed at a desired indicator (mark) 8 on the paper sheet 7, the document camera 3 photographs the situation where the user is pointing the finger at the mark 8. Then, the data processing apparatus 1 acquires the photographed image from the document camera 3, analyzes the photographed image to determine which mark 8 has been specified by the user, and inputs a command allotted to the mark 8. Note that the pointing operation may be carried out in such a manner that a fingertip is brought into contact with or in close proximity with the mark 8. As long as the mark 8 specified by the user can be recognized, the state of proximity is arbitrary. As such, the paper sheet 7 is used when the operation on the side of the data processing apparatus 1 (operation corresponding to the type of the mark 8) is performed corresponding to the pointing operation for the mark 8.

Figure 3:
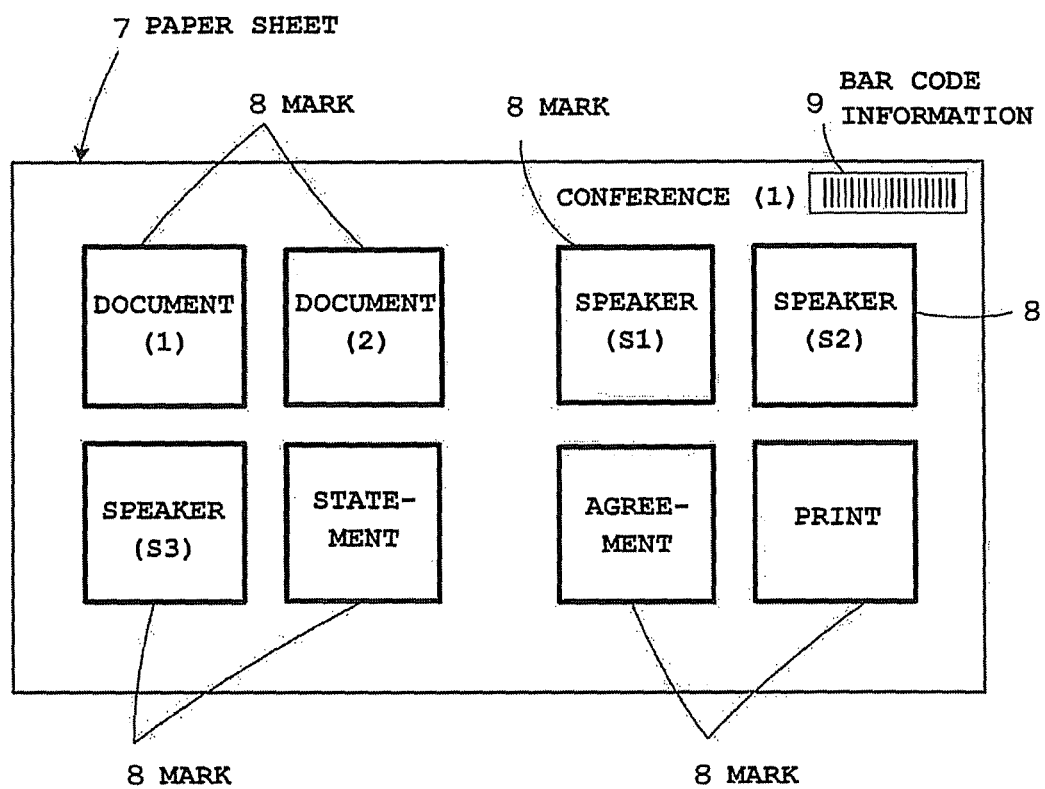
FIG. 3 is a diagram to describe a paper sheet 7 serving as a command input medium.

FIG. 3 is a diagram to describe the paper sheet 7. The paper sheet 7 is a belt-shaped paper sheet on which marks 8 of plural types are printed in an array. In the example illustrated, a rectangular mark 8 is printed in an array in the form of two-by-four matrix. On the right end side of an upper portion of the paper sheet 7, bar code information 9 representing sheet recognition information (sheet ID) is printed along with a sheet name "conference (1)". The character strings on each mark 8 clearly specify the name of a command to be inputted. For example, in the diagram, from the left side of the upper tier of the mark 8, the character strings (name of command) of "document (1)", "document (2)", "speaker (S1)", and "speaker (S2)" are printed, and from the left side of the lower tier of the mark 8, the character strings (name of command) of "speaker (S3)", "statement", "agreement", and "print" are printed.

Here, the marks 8 of "document (1)" and "document (2)" are marks that are specified by the user when the user requests the transmission of the document (1) or (2). The marks 8 of "speaker (S1)", "speaker (S2)", and "speaker (S3)" are marks that are specified by the user when the user requests the transmission of images (facial images) of speakers. The mark 8 of "statement" is a mark that is specified by the user when the user requests mediation to a chairperson before making a statement. The mark 8 of "agreement" is a mark that is specified by the user when the contents of the counterpart's statement are impressive and the user agrees with it. As such, these marks 8 printed on the paper sheet 7 are associated with operations corresponding to the types of the marks 8 one to one. Note that each mark 8 printed on the paper sheet 7 differs for each application and is associated with a different operation for every application.

FIG. 4 is a diagram to describe a method of recognizing the mark 8 when the user carries out the pointing operation to point a desired mark 8 with the use of the paper sheet 7. When the situation where the user is pointing a finger at the mark 8 on the paper sheet 7 is photographed by the document camera 3, the data processing apparatus 1 discriminates (recognizes) which mark 8 has been designated, based on the photographed image. That is, the entire rectangular mark 8 on the paper sheet 7 is constituted by a rectangular frame in red (red frame), and the document camera 3 photographs only a red color by a color filtering function.

Then, the data processing apparatus 1 extracts a red-frame image whose size is closest to the rectangular frame of the mark 8, from the photographed image acquired by the document camera 3. In the example illustrated, the red-frame images of the marks 8 of the document (1) and the document (2) have been extracted. A red-frame image in which part of the red frame is missing (covered with the finger) by the user's pointing is specified from the red-frame images, and this red-frame image is recognized as the mark 8 pointed with the user's finger. In the example illustrated, among the marks 8 of the document (1) and the document (2), the mark 8 of the document (2) has been recognized as the mark 8 specified by the user's pointing operation, whereby the document (2) can be acquired and displayed on the user's terminal screen.

Figure 5:
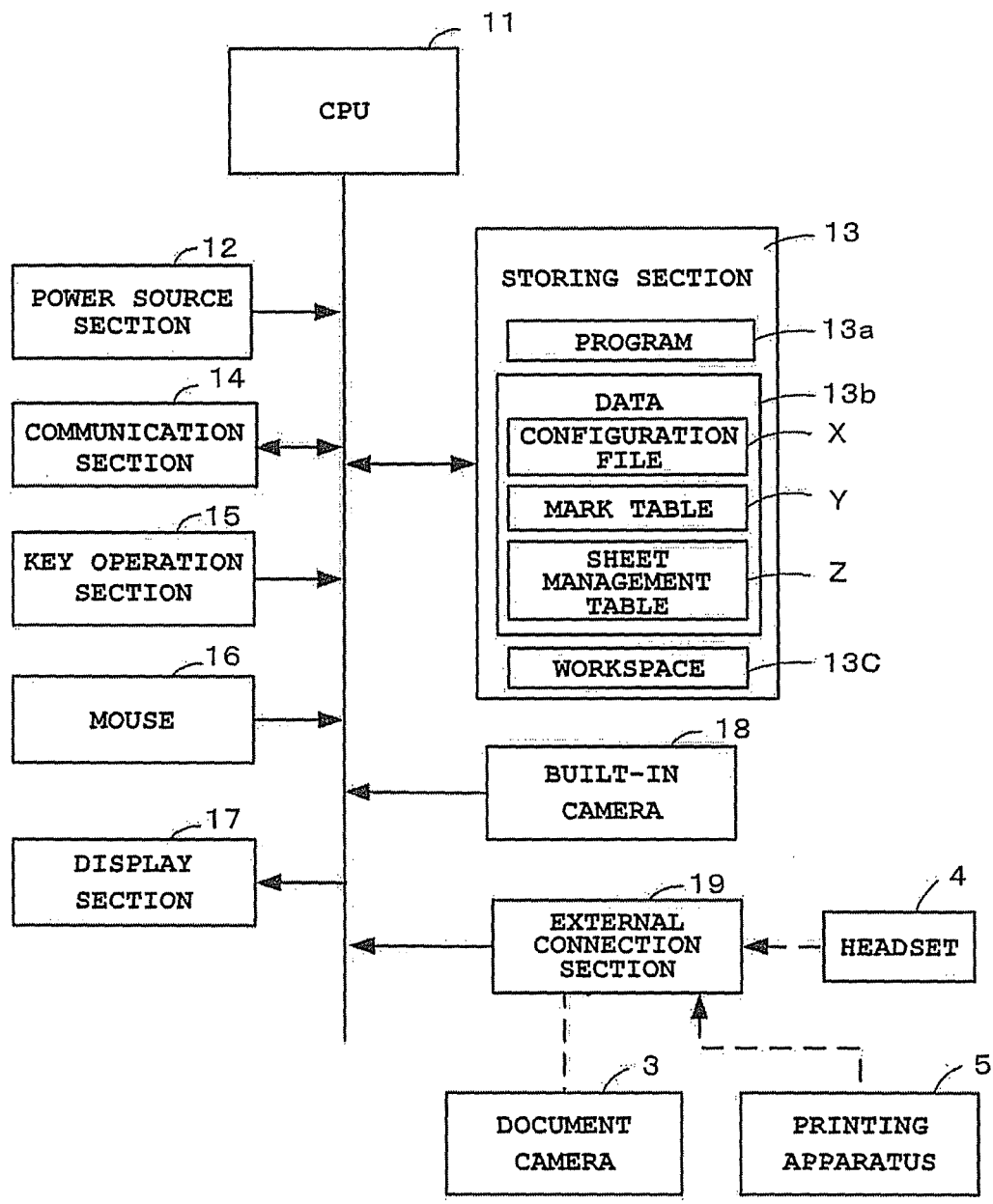
FIG. 5 is a block diagram illustrating the basic configuration of the built-in-camera-equipped data processing apparatus 1.
Figure 10:
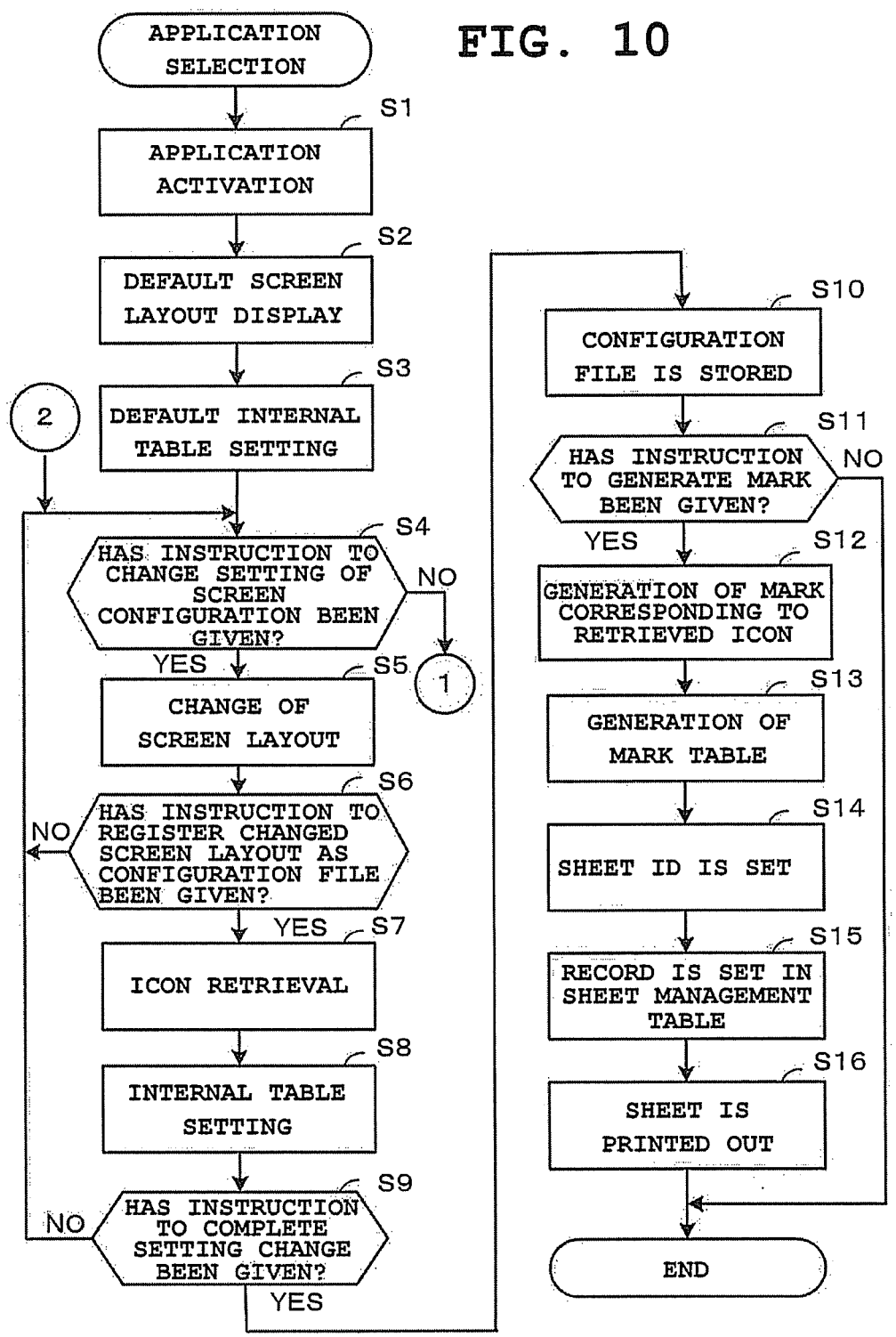
FIG. 10 is a flowchart to describe the operations of the data processing apparatus 1.
Figure 11:
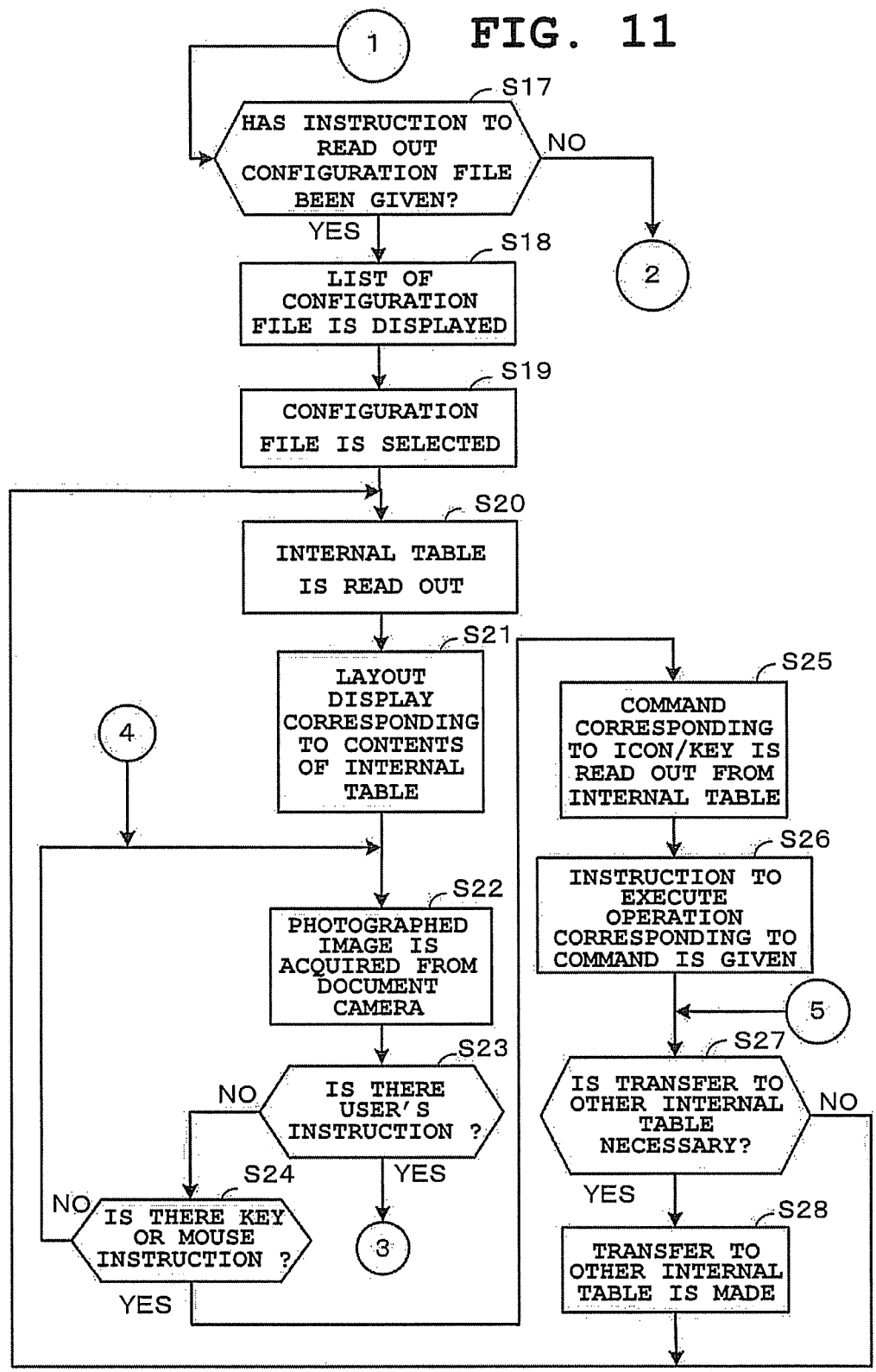
FIG. 11 is a flowchart of operations following the operations in FIG. 10.
Figure 12:
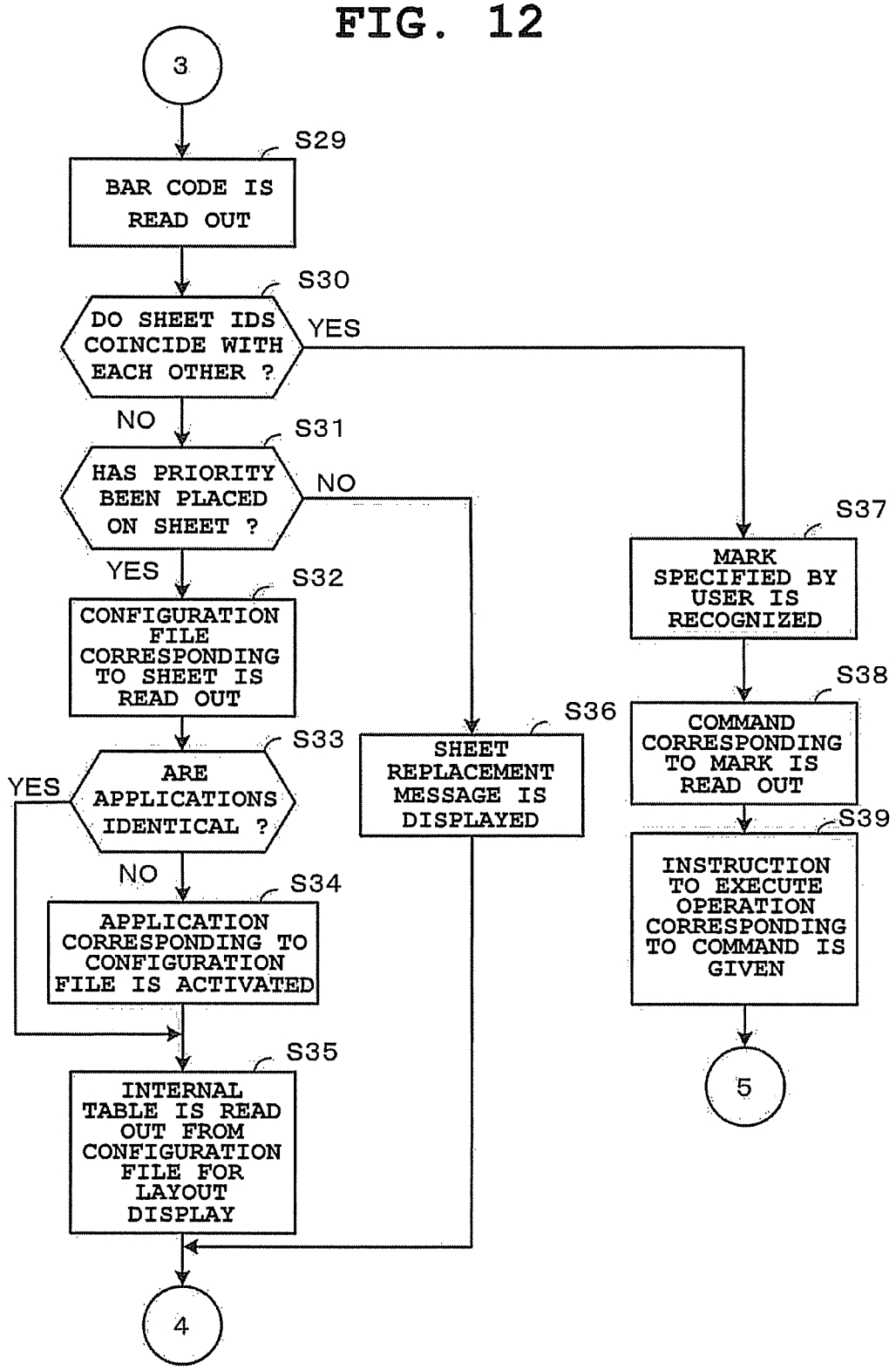
FIG. 12 is a flowchart of operations following the operations in FIG. 11.

FIG. 5 is a block diagram illustrating the basic configuration of the built-in-camera-equipped data processing apparatus 1 (for example, notebook-type personal computers). A CPU 11 in FIG. 5 serves as a kernel of the data processing apparatus 1 and is operated on power supplied from a power source section 12. This CPU 11 is a central processing unit which controls the entire operations of the data processing apparatus 1 in accordance with various programs in a storing section 13. The storing section 13 stores various programs and information, which includes a data area 13b that stores various data required for the data processing apparatus 1 and a workspace area 13c for temporary storage, in addition to a program area 13a in which programs and various applications to realize the embodiment of the present invention in accordance with the operational procedures illustrated in FIGS. 10 to 12 are stored. A configuration file X, a mark table Y, and a sheet management table Z, which are described later, are stored in the data area 13b.

A communication section 14 is connected (for example, optical communication connection) to the broadband public communications network at the time of operations for an electronic mail function and an Internet connection function. A key operation section 15 includes various push-button type keys for inputting data and commands, and a pointing device (mouse) 16 is used to select and specify an icon and a button on a screen so as to input data and commands. Here, in the embodiment of the present invention, a means of inputting commands that are acceptable by a currently executed application is not limited to the aforementioned command input using the paper sheet 7, and it is possible to input the aforementioned commands by pointing the mouse pointer at an icon or a button on the display screen with the use of the mouse 16, or by a key operation using the key operation section 15.

A display section 17 is a high definition crystal liquid display or an organic electroluminescence (Electro Luminescence) display having an uneven aspect ratio, and displays an operation screen. A built-in camera 18 is a digital camera that photographs the user to be faced (participant of conference), in which an image of an object through the taking lens is formed by the image sensor elements (CCD or CMOS) not shown, whereby a static image or a moving image is captured in high definition. An external connection section 19 includes a USB (Universal Serial Bus) connector, and thereby is connected to the document camera 3 which photographs documents for conferences, the headset 4, and the printing apparatus 5.

Figure 6:
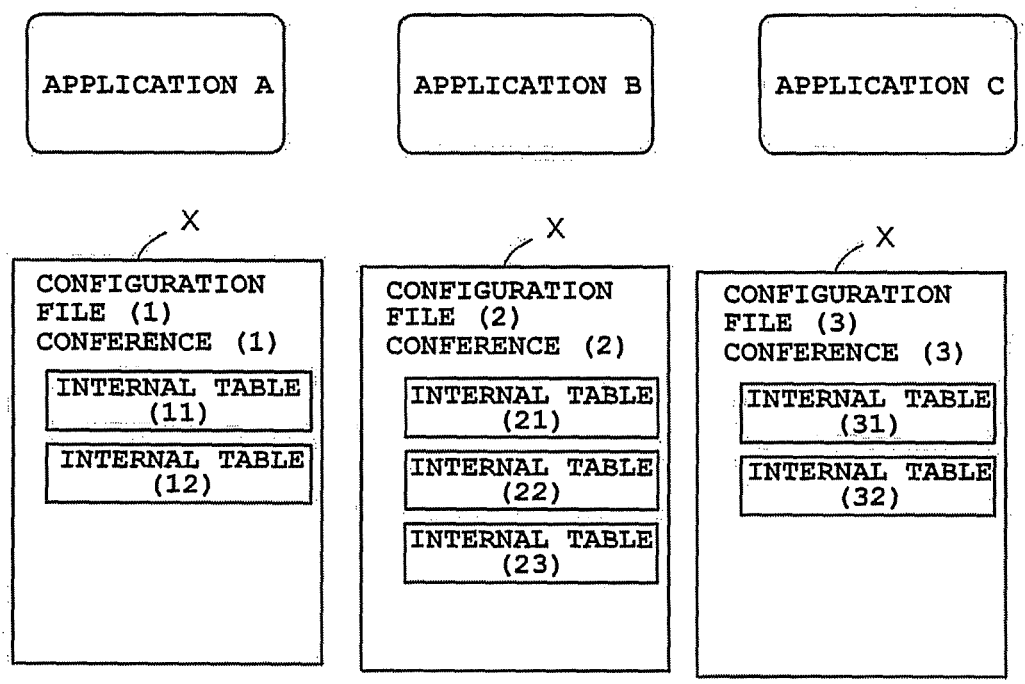
FIG. 6 is a diagram to describe the configuration file X of a screen to be displayed during the execution of an application.

FIG. 6 is a diagram to describe the configuration file X of a screen to be displayed during the execution of an application. The configuration file X is a file regarding the layout of an application screen, in which the configuration of screen layout is set as to where to place an icon on a screen to be displayed at the time of executing the application and as to the size to be applied to the icon. This configuration file X is provided for each application screen. In a case where a plurality of screens are used for one application, a plurality of configuration files X are provided corresponding to the number of screens. In this case where the plurality of configuration files X are provided for one application, the paper sheet 7 is prepared for each configuration file X. That is, the paper sheet 7 is prepared for each application, as described above. In the case where the plurality of configuration files X are provided for one application, the paper sheet 7 is prepared for each configuration file X.

In the example in FIG. 4, "configuration file (1), conference (1)", "configuration file (2), conference (2)", and "configuration file (3), conference (3)" have been provided as the screen layout of respective applications A, B and C. In "configuration file (1), conference (1)", an internal table (11) and an internal table (12) have been set. In "configuration file (2), conference (2)", an internal table (21) an internal table (22), and an internal table (23) have been set. In "configuration file (3), conference (3)", an internal table (31) and an internal table (32) have been set.

Figure 7:
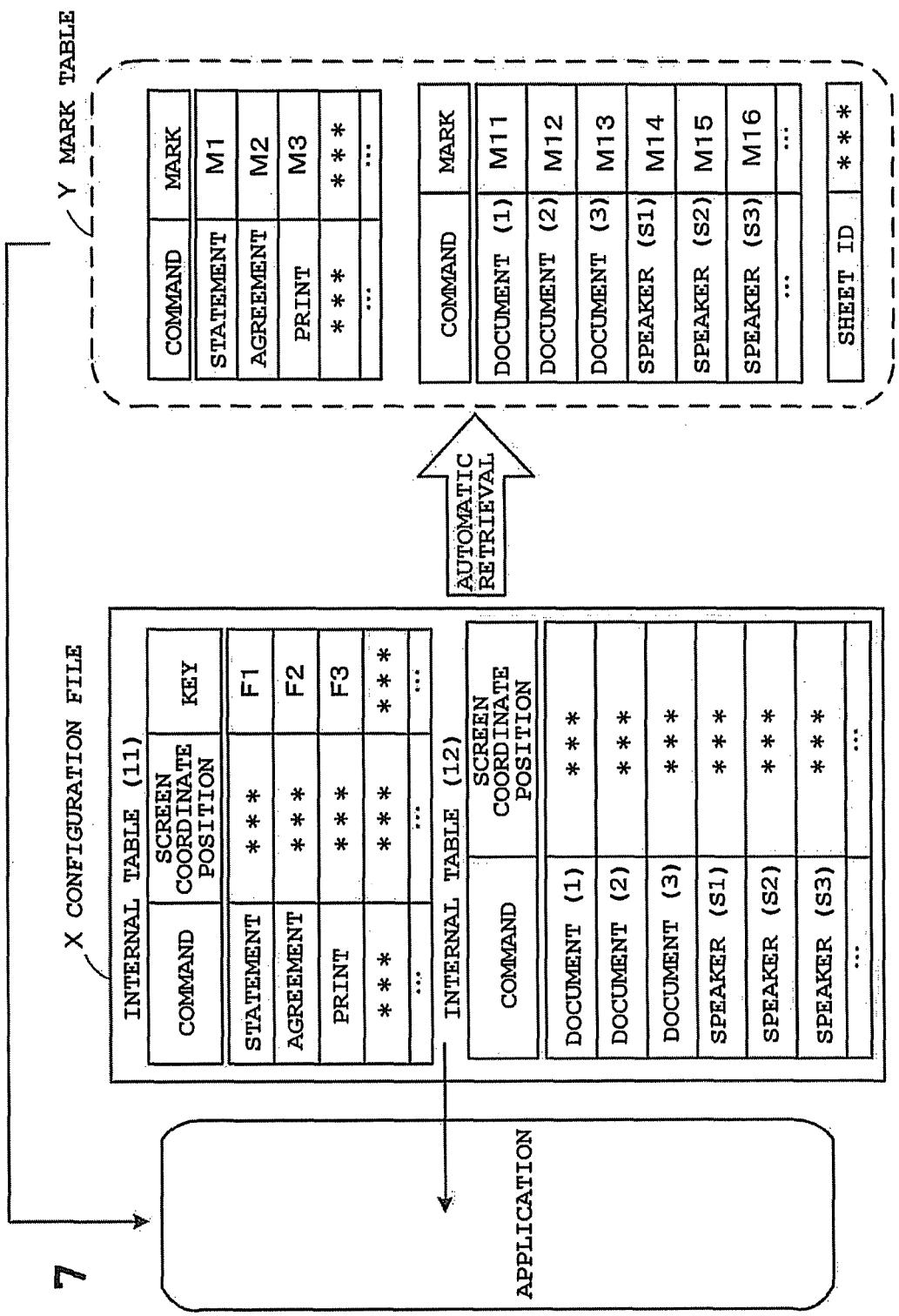
FIG. 7 is a diagram to describe the contents of a mark table Y.

FIG. 7 is a diagram which specifically illustrates the contents of setting in the internal table provided in the configuration file X, and describes the contents of the mark table Y automatically generated based on the contents of the setting in the internal table. In the example illustrated, the internal table (11) and the internal table (12) of "configuration file (1), conference (1)" are represented as the internal table of the configuration file X, and the internal table (11) includes respective fields of "command", "screen coordinate position", and "key". "Command" represents icons to be displayed on the application screen and commands allotted to the icons, and "statement", "agreement", and "print" have been set in the example.

Figure 8:
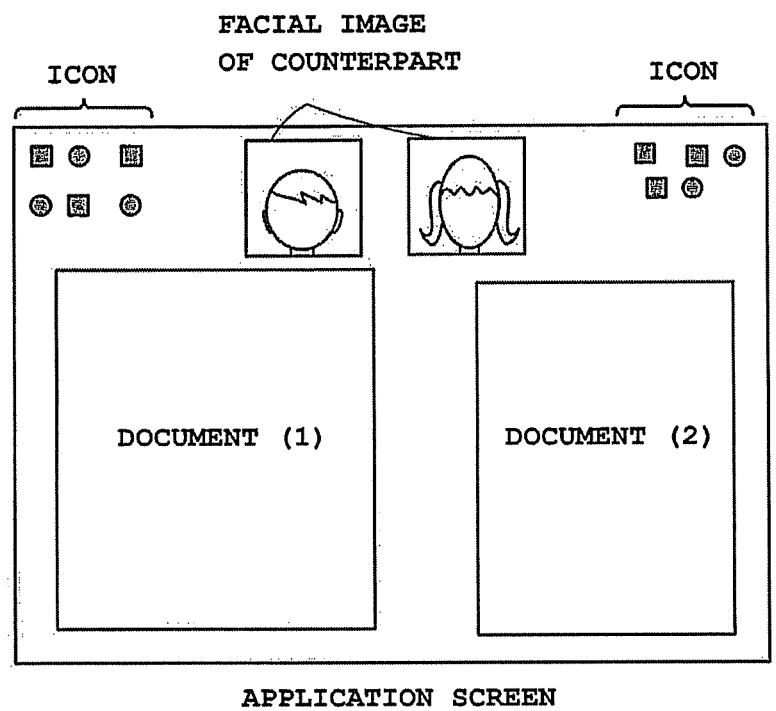
FIG. 8 is a diagram illustrating an application screen.

"Screen coordinate position" represents the positional coordinates of an icon ("statement", "agreement", "print" . . . ) in a case where the icon is selected based on a mouse operation. FIG. 8 is a diagram illustrating a display example of icons on an application screen. In the illustrated application screen, facial images of plural counterparts are displayed in an array, "document (1)" and "document (2)" are displayed in an array as various documents, and a plurality of icons are displayed in predetermined areas on the application screen. "Screen coordinate position" represents the positional coordinates of an icon to be displayed on this application screen. "Key" represents a key operation in place of icon selection by a mouse operation, and respective keys of "F1", "F2", "F3", etc. have been allotted and set corresponding to the icons "statement", "agreement", and "print".

The internal table (12) includes fields of "command" and "screen coordinate position". In the "command" field, "document (1)", "document (2)", "document (3)", "speaker (S1)", "speaker (S2)", and "speaker (S3)" have been set. The mark table Y is automatically generated based on the contents of setting in the internal table (11) and the internal table (12). This mark table Y serves as an information sheet that stores and manages, for each application, the paper sheet 7 where plural types of commands that are acceptable during the execution of an application, and the plural types of marks 8 representing each command have been associated with each other. Fields of "command" and "mark" are included in the mark table Y. Also, a sheet ID by which the paper sheet 7 is individually identified is stored in the mark table Y.

In the example illustrated, "M1", "M2", and "M3" have been set as "marks" corresponding to "command" of "statement", "agreement", "print", etc. in the mark table Y corresponding to the internal table (11). In addition, "M11", "M12", "M13", "M14", "M15", and "M16" have been set as "marks" corresponding to "command" of "document (1)", "document (2)", "document (3)", "speaker (S1)", "speaker (S2)", and "speaker (S3)" in the mark table Y corresponding to the internal table (12). Moreover, "ID1" has been set as "sheet ID" for recognition.

FIG. 9 is a diagram to describe the sheet management table Z. The sheet management table Z is a table that stores and manages information on the mark table Y every time the mark table Y is automatically generated, which includes fields of "configuration file ID", "internal table ID", and "sheet ID". As such, the sheet management table Z stores and manages the sheet ID which associates the paper sheet 7 with each application, as link information. In the sheet management table Z of the illustrated example, "application A (conference (1))", "application A (conference (1))", "application A (conference (2))", etc. have been set in the "configuration file ID" field, "(11)", "(12)", "(21)", etc. have been set in the "internal table ID" field, and "ID1", "ID2", "ID3", etc. have been set in the "sheet ID" field.

Next, the operational concept of the data processing apparatus 1 according to the embodiment of the present invention will be described referring to flowcharts illustrated in FIGS. 10 to 12. Here, each function described in the flowcharts is stored in a readable program code format, and operations based on these program codes are sequentially performed. Also, operations based on the above-described program codes transmitted over a transmission medium such as a network can also be sequentially performed. That is, the unique operations of the present embodiment can be performed using programs and data supplied from an outside source over a transmission medium, in addition to a recording medium. Note that these flowcharts in FIGS. 10 to 12 outline operations of the characteristic portion of the present embodiment from among all of the operations of the data processing apparatus 1. After exiting the flows in FIGS. 10 to 12, the procedure returns to the main flow (not shown) of the overall operation.

FIGS. 10 to 12 are flowcharts to describe the operations (characteristic operations of the embodiment of the present invention) of the data processing apparatus 1, and the first operation is started in response to the selection of applications to be activated. First, after activating an application selected and specified by a user operation (Step S1 in FIG. 10), the CPU 11 of the data processing apparatus 1 performs the layout display of the default screen on the display section 17 (Step S2), and performs the default setting for the internal table of the configuration file X based on the contents of display on the default screen (Step S3). In this state, the CPU 11 judges whether an instruction to change the setting of the screen configuration has been given by a user operation (Step S4). Here, when setting the screen layout of the selected application to a screen layout for the conference (1), the user instructs the data processing apparatus 1 to change the setting of the screen configuration, in order to appropriately change the screen layout of the application to the screen layout for the conference (1) prior to the opening of the conference.

When judged that an instruction to change the setting of the screen configuration has been given by a user operation (Step S4, YES), the CPU 11 carries out processing for arbitrarily changing the screen layout based on the user operation, such as processing for adding and deleting the icons and the buttons (Step S5). When the screen layout is changed by this processing, the CPU 11 judges whether an instruction to register the changed screen layout as the configuration file X has been given by a user operation (Step S6). When judged that an instruction to register the changed screen layout has not been given (Step S6, NO), the CPU 11 returns to the aforementioned Step S4. Conversely, when judged that an instruction to register the changed screen layout has been given (Step S6, YES), the CPU 11 retrieves the icons and buttons on the application screen (Step S7) and carries out processing for setting the internal table based on the retrieved icons and buttons (Step S8). In this case, with respect to each icon and button, the CPU 11 acquires a command allotted to the icon and button and performs setting for each of the fields "command" and "screen coordinate position". In addition, the CPU 11 performs setting for keys of the "key" field which correspond to specific icons and buttons and used for inputting commands allotted to these icons and buttons.

Next, the CPU 11 judges whether an instruction to complete the setting change of the screen configuration has been given by a user operation (Step S9), and returns to Step S4. Hereafter, the CPU 11 repeats the aforementioned operations (Steps S4 to S9) until an instruction to complete the setting change is given (Step S9, NO). When judged that an instruction to complete the setting change has been given (Step S9, YES), the CPU 11 stores the configuration file X including the set internal table, and after generating the configuration file ID, adds it to the configuration file X (Step S10). Next, the CPU 11 judges whether an instruction to generate the mark table (information sheet) Y has been given by a user operation (Step S11). When judged that an instruction to generate the mark table Y has not been given (Step S11, NO), the CPU 11 ends the flow of FIGS. 10 to 12.

When judged that an instruction to generate the mark table Y has been given (Step S11, YES), the CPU 11 generates the mark 8 corresponding to each icon retrieved at the aforementioned Step S7 (Step S12), and automatically generates the mark table Y based on the mark 8 (Step S13). In this case, with respect to each retrieved icon and button, the mark table Y, in which the command allotted to the icon and button and the mark 8 generated as described above have been associated, is automatically generated. Then, the CPU 11 generates the sheet ID and stores it in the mark table Y (Step S14). Accordingly, when the mark table Y is generated, the CPU 11 generates a record including the fields of "configuration file ID", "internal table ID", and "sheet ID", and additionally registers it in the sheet management table Z (Step S15).

Then, the CPU 11 converts "sheet ID" to the bar code information 9, and transmits the bar code information 9 and each "mark" in the mark table Y from the external connection section 19 to the printing apparatus 5 so as to print out the mark and the bar code information (Step S16). In this case, on the side of the printing apparatus 5, the bar code information is printed on a predetermined area according to a predetermined print form, and "marks" in the mark table Y are sequentially printed in an array. For example, "mark M1" and "mark M2" are printed in an array. In this case, "statement" is printed for "mark M1" as the name of the command, and "agreement" is printed for "mark M2" as the name of the command.

Accordingly, the paper sheet 7 is automatically issued. This paper sheet 7 is generated for each application (further, each screen (configuration file X) displayed during the execution of the application). That is, when there exist a plurality of screens to be displayed during the execution of the application, the CPU 11 acquires icons and buttons (commands) for each application screen, generates plural types of marks based on the acquired icons and buttons for each of the plurality of screens, generates the mark table Y for each of the plurality of screens, and prints out and issues the paper sheet 7 for each of the plurality of screens. When the printing above is ended, the flow of FIGS. 10 to 12 is completed.

At Step S4, when judged that an instruction to change the setting of the screen configuration has not been given (Step S4, NO), the CPU 11 proceeds to the flow in FIG. 11, and judges whether an instruction to read out the configuration file X has been given by a user operation (Step S17). Here, in view of the opening of the conference, the user instructs to read out the configuration file X set for the conference in advance, by a user operation. When judged that an instruction to read out the configuration file X has been given (Step S17, YES), the CPU 11 refers to the sheet management table Z and displays a list of each configuration file X (Step S18). Then, when an arbitrary configuration file X is selected and designated from the list screen by a user operation (Step S19), the CPU 11 refers to the sheet management table Z, and after reading out the internal table from the selected and designated configuration file X (Step S20), displays on the display section 17 the application screen corresponding to the contents of setting for the internal table (Step S21).

In the state where a desired application screen for the conference has been displayed, the CPU 11 acquires a photographed image from the document camera 3 (Step S22), analyzes the photographed image, and thereby judges whether one of the marks 8 on the paper sheet 7 has been specified by the user's pointing operation (Step S23). When judged that none of the marks 8 has been specified by the user's pointing operation (Step S23, NO), the CPU 11 judges whether a key operation or a mouse operation has been carried out (Step S24). When judged that a key operation or a mouse operation has been carried out (Step S24, NO), the CPU 11 returns to the aforementioned Step S22.

When a key operation or a mouse operation is detected (Step S24, YES), the CPU 11 reads out, according to the operated key or the area of the icon or button subjected to the mouse operation, the command associated with the operated key or the command individually associated with the area subjected to the mouse operation (icon or button), from the internal table (Step S25). Then, the CPU 11 instructs the currently executed application to execute the operation corresponding to the command (Step S26).

The CPU 11 judges whether the transfer to other internal table is required due to the execution of the operation of the application (Step S27). When judged that the transfer to other internal table is not required (Step S27, NO), the CPU 11 returns to the aforementioned Step S22, and enters a waiting state. When judged that the transfer to other internal table is required (Step S27, YES), the CPU 11 designates the other internal table as a subject to be read out (Step S28), and after returning to the aforementioned Step S20, reads out the content of setting for the other internal table, and repeats the aforementioned operations hereafter.

At Step S23, when judged that one of the marks 8 on the paper sheet 7 has been specified by the user's pointing operation through the analysis of the photographed image from the document camera 3 (Step S23, YES), the CPU 11 proceeds to the flow in FIG. 12, and after analyzing the photographed image, reads out the bar code information on the paper sheet 7, and converts the bar code information to the sheet ID (Step S29). Then, the CPU 11 reads out "sheet ID" associated with the internal table of the currently executed configuration file X from the sheet management table Z, compares "sheet ID" with the sheet ID read out from the paper sheet 7, and judges whether the sheet IDs coincide with each other (Step S30). That is, the CPU 11 judges whether the paper sheet 7 placed in front of the document camera 3 is a paper sheet corresponding to the currently executed application screen.

When the inconsistency between the sheet IDs is detected (Step S30, NO), since the paper sheet 7 placed in front of the document camera 3 is not a paper sheet corresponding to the currently executed application screen, the CPU 11 refers to a priority flag (not illustrated) arbitrarily set in advance, and judges whether the sheet ID read out from the paper sheet 7 takes priority over the sheet ID read out from the sheet management table Z (Step S31). That is, the CPU 11 judges whether the paper sheet 7 placed in front of the document camera 3 takes priority over the currently executed application screen. When no prioritization has been set (Step S30, NO), that is, when priority has been placed on the sheet ID read out from the sheet management table Z, the CPU 11 displays a message requesting the replacement of the paper sheet 7 (Step S36), and returns to the Step S22 in FIG. 11.

Also, when priority has been placed on the paper sheet 7 (Step S31, YES), the CPU 11 refers to the sheet management table Z based on the sheet ID, and after reading out the configuration file X associated with the sheet ID (Step S32), judges whether an application corresponding to the configuration file X is identical to the currently executed application (Step S33). That is, the CPU 11 judges whether the applications are identical although the sheet IDs do not coincide with each other. For example, when the sheet ID read out from the paper sheet 7 is "ID1", and the sheet ID read out from the sheet management table Z is "ID2", the applications are "A" and therefore identical (Step S33, YES). Accordingly, the CPU 11 proceeds to the next Step S34, and after reading out the internal table from the configuration file X, displays the internal table for the purpose of the screen layout (Step S35). At Step S33, when the applications are not identical (Step S33, NO), the CPU 11 activates the application corresponding to the sheet ID read out from the paper sheet 7 (Step S34), reads out the internal table from the configuration file X, and performs layout display therefor (Step S35).

At Step S30, when the sheet ID read out from the paper sheet 7 coincides with the sheet ID read out from the sheet management table Z (Step S30, YES), the CPU 11 recognizes the mark 8 on the paper sheet 7 specified by the user through the analysis of the photographed image of the paper sheet 7 from the document camera 3 (Step S37), and reads out the command corresponding to the mark 8 with reference to the mark table Y based on the mark 8 (Step S38). In addition, the CPU 11 instructs the currently executed application to execute the operation corresponding to the command (Step S39). Then, the CPU 11 proceeds to the Step S27 in FIG. 11.

As described above, in the present embodiment, when the user points at an arbitrary mark 8 on the paper sheet 7 where the indicators (marks) 8 corresponding to plural types (command) of instructive information acceptable by a currently executed application are printed in an array, the data processing apparatus 1 determines the mark 8, refers to the mark table Y based on the mark 8, selects the command corresponding to the mark 8, and instructs the currently executed application to execute an operation in accordance with the command. As a result of this configuration, the array of the marks 8 on the paper sheet 7 can be set in units of application. Therefore, only by pointing at a desired mark 8 from among a few arrayed marks, the user can execute the operation allotted to the desired mark 8, whereby further improvement of the operability can be expected. That is, the entire screen during the execution of an application (during a conference) is hard to see due to complicatedness as illustrated in FIG. 8, and an operation at an exact position is required, because of which the operability is poor for a user who is inexperienced in the operation. However, in the present embodiment, the user is only required to carry out a pointing operation to point at an arbitrary mark 8 on the paper sheet 7 where the marks 8 have been arrayed in units of application, by which the improvement of the operability can be expected, and the user can focus on the conference.

Also, the CPU 11 refers to the sheet management table Z based on bar code information (sheet ID) acquired from the paper sheet 7 and specifies the application corresponding to the sheet ID. When the application is currently being executed, the CPU 11 determines an arbitrary mark 8 specified by the user on the paper sheet 7. As a result of this configuration, an application can be specified from the paper sheet 7. When the application is currently being executed, a specifying operation on the mark 8 using the paper sheet 7 can be enabled, and the association between the sheet paper 7 and the application can be maintained.

Also, when an application specified from the paper sheet 7 is not currently being executed, this status is informed by message display, based on which the user can replace the paper sheet 7, and maintain the association between the paper sheet 7 and the application.

Moreover, when an application specified from the paper sheet 7 is not currently being executed, the application is activated, which makes it possible to maintain the association between the paper sheet 7 and the application, without a specific operation to be performed by the user.

Furthermore, the means of inputting commands acceptable by a currently executed application is not limited to the command input with the use of the paper sheet 7, and the command input can be performed by pointing at and specifying an icon on the display screen with the use of the mouse 16. Therefore, the user who is experienced in the operation can select an input means, which improves the usability.

Still further, the means of inputting commands acceptable by a currently executed application is not limited to the command input with the use of the paper sheet 7, and the command input can be performed by a key operation. Therefore, the user who is experienced in the operation can select an input means, which improves the usability.

Yet still further, the mark table Y is stored and managed for each configuration file X in one application in such a manner to maintain the association between plural types of commands that are acceptable when the application is executed based on the configuration file X and plural types of marks 8 representing the commands. As a result of this configuration, the association between plural types of marks 8 and the configuration of a screen layout displayed during the execution of an application can be established.

Yet still further, plural types of commands acceptable during the execution of an application are acquired, and a mark 8 representing each command is generated and stored in the mark table Y. As a result of this configuration, the mark table Y can automatically be generated.

Yet still further, when the document camera 3 photographs a situation where an arbitrary mark 8 on the paper sheet 7 has been specified by the user, the data processing apparatus 1 analyzes the photographed image and determines which mark 8 has been designated. As a result of this configuration, only by pointing at the direction of a mark 8, the user can perform processing for an application.

Yet still further, plural types of commands acceptable during the execution of an application are acquired, plural types of marks 8 representing the commands are generated, the association between the plural types of commands and the plural types of marks 8 is established and stored in the mark table Y, and the generated marks 8 are outputted in an array. As a result of this configuration, only by pointing at an arbitrary mark 8 on the automatically generated paper sheet 7, the user can perform an operation allotted to the mark 8, by which further improvement of the operability can be expected.

Yet still further, the plural types of commands acceptable during the execution of an application may be allotted to icons or buttons on the display screen which can be specified by a pointing operation using the mouse 16. Therefore, the means of inputting commands acceptable by a currently executed application is not limited to the command input using the paper sheet 7, and the command input can be performed using the mouse 16. As a result of this configuration, the user who is experienced in the operation can select an input means, by which further improvement of the usability can be expected.

Yet still further, the plural types of commands acceptable during the execution of an application may be allotted to keys on the key operation section 15 Therefore, the means of inputting commands acceptable by a currently executed application is not limited to the command input using the paper sheet 7, and the command input can be performed by a key operation As a result of this configuration, the user who is experienced in the operation can select an input means, by which further improvement of the usability can be expected.

Yet still further, plural types of commands are acquired which are acceptable for each of a plurality of screens (configuration file X) displayed during the execution of an application, plural types of marks are generated based on the commands acquired for each of the plurality of screens, the association between the plural types of commands and the plural types of marks is established and stored in the mark table Y for each of the plurality of screens, and the generated marks are outputted in an array for each of the plurality of screens. As a result of this configuration, the paper sheet 7 can automatically be generated for each of a plurality of screens displayed during the execution of an application.

In the present embodiment, when the user carries out a pointing operation of pointing at a desired mark 8 with the use of the paper sheet 7, a red-frame image, in which part of the red frame is missing (covered with the finger) by the user's pointing operation, is specified from among the marks 8 and recognized as the mark 8 pointed by the user, as a method of recognizing the mark, as illustrated in FIG. 4. However, when there are a plurality of red-frame images whose part is missing, one red-frame image may be selected from them as described below.

Figure 13:
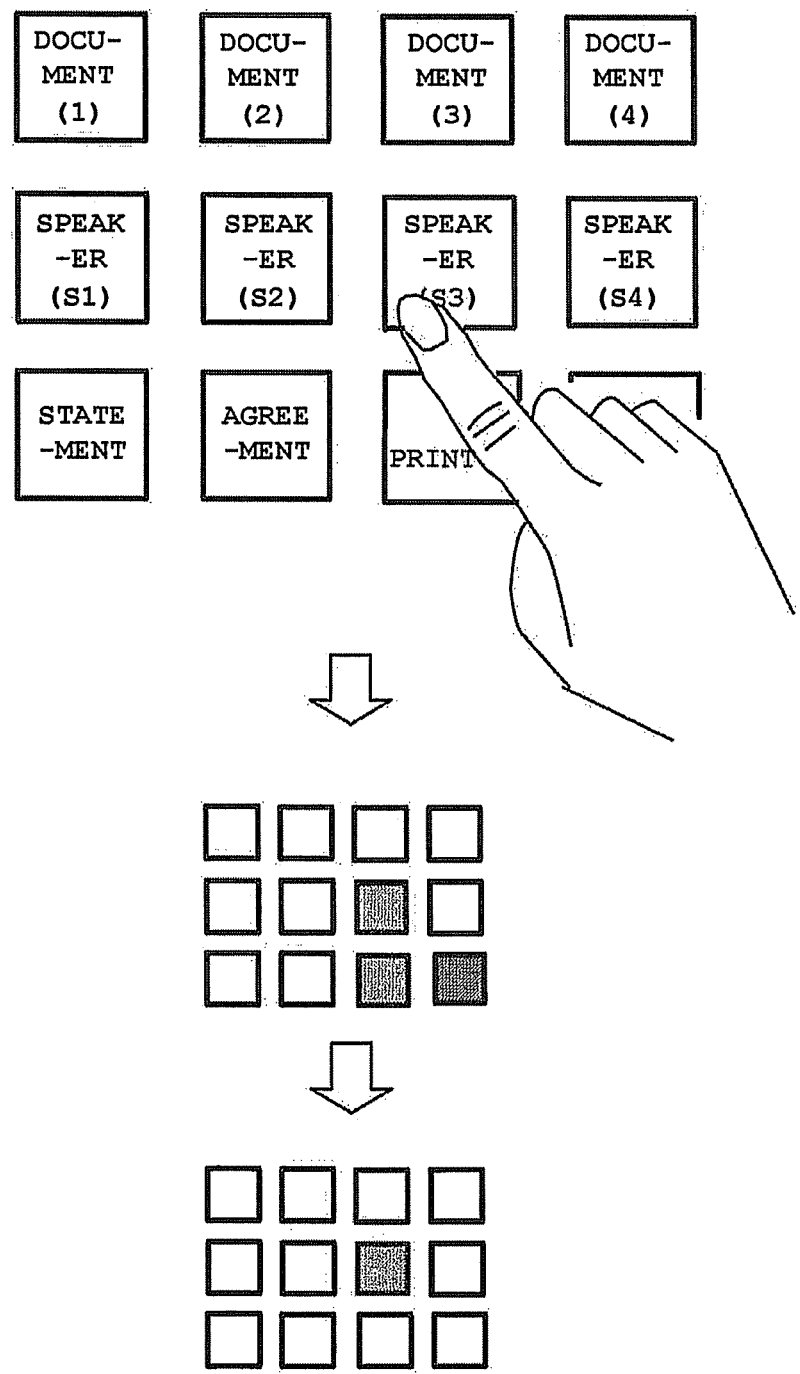
FIG. 13 is a diagram to describe a variation example of the embodiment of the present invention.

In the example of FIG. 13 where the marks 8 have been printed and arrayed on the paper sheet 7 in the form of three-by-four matrix, a plurality of marks 8 (marks blackened out in the diagram), that is, part of the marks 8 arranged at the third column from the left in the second row from the top, and part of the marks 8 arranged at the third and fourth columns of the third row are missing (covered with the finger) by the user's pointing operation. In this case, the mark 8 arranged on the highest side, that is, the mark 8 arranged at the third column of the second row may be specified from among the plurality of marks 8 whose part is missing, and recognized as a mark 8 pointed with the user's finger. Note that, depending on the direction of pointing a finger, the most leftward mark 8 or the most rightward mark 8 may be recognized as a mark 8 pointed with the user's finger.

Also, in the present embodiment, the paper sheet 7 on which the plural types of marks 8 have been printed in an array is printed and issued. However, the plural types of marks 8 may be arrayed and displayed on the display section 17. In this case where the plural types of marks 8 are arrayed and displayed on the display section 17, the printing apparatus 5 is unnecessary.

Moreover, in the present embodiment, the document camera 3 photographs a situation where the user is pointing a finger at the mark 8 on the paper sheet 7. However, a configuration may be adopted in which, in a state where a touch display section (not illustrated) including a touch screen on the display panel has been provided and the plural types of marks 8 have been displayed in an array on the touch display section, when the user touches the display position of an arbitrary mark 8, the touched mark 8 is recognized. In this case where the plural types of marks 8 are arrayed and displayed, photographing apparatuses such as the printing apparatus 5 and the document camera 3 are unnecessary.

Furthermore, as examples of plural types of indicators representing commands, the marks 8 have been described in the present embodiment. However, the present invention is not limited thereto, and character strings and symbols maybe used. Also, in a case where the number of indicators is small, positions or areas in the up, down, left, and right directions may be applied as the plural types of indicators.

Still further, in the present embodiment, the present invention has been applied to a video conference system. However, it may be applied to a communication system other than a video conference system. Also, the present invention may be applied to not only a system but also a single data processing apparatus. Moreover, as a data processing apparatus, the present invention may be applied to portable terminal apparatuses such as desk-top personal computers, notebook-type personal computers, tablet terminals, cellular phones such as smart phones, game machines, music players, and digital cameras.

Yet still further, the "devices" or the "sections" described in the above-described embodiment are not required to be in a single housing and may be separated into a plurality of housings by function. In addition, the steps in the above-described flowcharts are not required to be processed in time-series, and may be processed in parallel, or individually and independently.

While the present invention has been described with reference to the preferred embodiments, it is intended that the invention be not limited by any of the details of the description therein but includes all the embodiments which fall within the scope of the appended claims.

What is claimed is:

1. A data processing apparatus, comprising:
    a memory storing computer executable sections; and
    a processor configured to execute the following computer executable sections stored in the memory:
    an indicator storing section which stores and manages, for each of a plurality of applications, plural types of instructive information which is acceptable during execution of an application and plural types of indicators representing the instructive information such that the plural types of instructive information and the plural types of indicators are associated with each other;
    a determination section which determines an indicator arbitrarily specified by a user operation from an output medium where the indicators corresponding to the plural types of instructive information acceptable by a currently executed application have been outputted in an array;
    a selection section which selects, based on the indicator determined by the determination section, instructive information corresponding to the indicator with reference to the indicator storing section; and
    a control section which controls the currently executed application to perform an operation in accordance with the instructive information selected by the selection section,
    wherein the determination section determines which indicator has been specified, by analyzing an image photographed by an imaging section which is showing a situation where an arbitrary indicator has been specified by a user operation from a paper medium on which the indicators are printed in an array or a display medium on which the indicators are displayed in an array.

2. The data processing apparatus according to claim 1, wherein the indicator storing section stores and manages, for each application, an information sheet in which the plural types of instructive information acceptable during the execution of the application and the plural types of indicators representing the instructive information have been associated with each other, and stores and manages link information that associates each information sheet with each application,
    wherein the data processing apparatus further comprises:
    an acquisition section which acquires the link information from the output medium where the plural types of indicators have been outputted in an array and the link information has been outputted; and
    a specification section which specifies an application associated with the link information with reference to the indicator storing section based on the link information acquired by the acquisition section, and
    wherein the determination section determines the indicator arbitrarily specified by the user operation from the output medium, when the application specified by the specification section is currently being executed.

3. The data processing apparatus according to claim 2, further comprising:
    a notification section which notifies that the application is not currently being executed, when the application specified by the specification section is not currently being executed.

4. The data processing apparatus according to claim 2, further comprising:
    an activation section which activates the application when the application specified by the specification section is not currently being executed.

5. The data processing apparatus according to claim 1, further comprising:
    a pointing input section which inputs instructive information acceptable by the currently executed application, by pointing and specifying an icon or a button displayed on a display screen,
    wherein the control section controls the currently executed application to perform an operation in accordance with the instructive information inputted by the pointing input section or the instructive information selected by the selection section.

6. The data processing apparatus according to claim 1, further comprising:
    a key input section which inputs instructive information acceptable by the currently executed application by a key operation,
    wherein the control section controls the currently executed application to perform an operation in accordance with the instructive information inputted by the key input section or the instructive information selected by the selection section.

7. The data processing apparatus according to claim 1, wherein the indicator storing section stores and manages, for each configuration file in one application, plural types of instructive information which is acceptable when the configuration file is executed by the application and plural types of indicators representing the instructive information such that the plural types of instructive information and the plural types of indicators are associated with each other.

8. The data processing apparatus according to claim 1, further comprising:
    an indicator generating section which acquires plural types of instructive information acceptable during the execution of the application, and generates indicators representing the instructive information,
    wherein the indicator storing section stores and manages each acquired instructive information and each generated indicator such that each acquired instructive information and each generated indicator are associated with each other.

9. The data processing apparatus according to claim 1, wherein the determination section determines which indicator has been specified, based on a point touched by a user operation performed on a touch display section where the indicators are displayed in an array.

10. A data processing apparatus, comprising:
a memory storing computer executable sections; and
a processor configured to execute the following computer executable sections stored in the memory:
an acquisition section which acquires plural types of instructive information which is acceptable during execution of an application;
a generation section which generates plural types of indicators representing the instructive information, for each of the plural types of instructive information acquired by the acquisition section;
an indicator storing section which stores and manages the plural types of instructive information acquired by the acquisition section and the plural types of indicators generated by the generation section such that the plural types of instructive information and the plural types of indicators are associated with each other; and
an output section which prints the plural types of indicators generated by the generation section, in an array on a paper medium for output.

11. The data processing apparatus according to claim 10, wherein the plural types of instructive information acceptable during the execution of the application is instructive information allotted to each icon or each button on a display screen which is capable of being pointed and specified by a pointing input section.

12. The data processing apparatus according to claim 10, wherein the plural types of instructive information acceptable during the execution of the application is instructive information allotted to each key on a key input section.

13. The data processing apparatus according to claim 10, wherein the acquisition section acquires plural types of instructive information which is acceptable by each of a plurality of screens that are displayed during the execution of the application,
wherein the generation section generates plural types of indicators based on each instructive information acquired by the acquisition section for each of the plurality of screens that are displayed during the execution of the application,
wherein the indicator storing section stores and manages the plural types of instructive information acquired by the acquisition section for each of the plurality of screens to be displayed during the execution of the application and the plural types of indicators generated by the generation section such that the plural types of instructive information and the plural types of indicators are associated with each other, and
wherein the output section outputs the plural types of indicators generated by the generation section in an array, for each of the plurality of screens that are displayed during the execution of the application.

14. A method for a data processing, comprising:
a storing and managing step of storing and managing, for each of a plurality of applications, plural types of instructive information which is acceptable during execution of an application and plural types of indicators representing the instructive information such that the plural types of instructive information and the plural types of indicators are associated with each other;
a determining step of determining an indicator arbitrarily specified by a user operation from an output medium where the indicators corresponding to the plural types of instructive information acceptable by a currently executed application have been outputted in an array;
a selecting step of selecting, based on the indicator determined in the determining step, instructive information corresponding to the indicator with reference to contents stored in the storing and managing step; and
a control step of controlling the currently executed application to perform an operation in accordance with the instructive information selected in the selecting step,
wherein the determining step determines which indicator has been specified, by analyzing an image photographed by an imaging section which is showing a situation where an arbitrary indicator has been specified by a user operation from a paper medium on which the indicators are printed in an array or a display medium on which the indicators are displayed in an array.

15. A method for a data processing, comprising:
an acquiring step of acquiring plural types of instructive information which is acceptable during execution of an application;
a generating step of generating plural types of indicators representing the instructive information, for each of the plural types of instructive information acquired in the acquiring step;
an storing and managing step of storing and managing the plural types of instructive information acquired in the acquiring step and the plural types of indicators generated in the generating step such that the plural types of instructive information and the plural types of indicators are associated with each other; and
an outputting step of printing the plural types of indicators generated in the generating step, in an array on a paper medium for output.

* * * * *